Sept. 26, 1933.  L. D. GOODSPEED  1,928,353
AUTOMATIC VARIETY WOOD TURNING LATHE
Filed Dec. 12, 1932   3 Sheets-Sheet 2
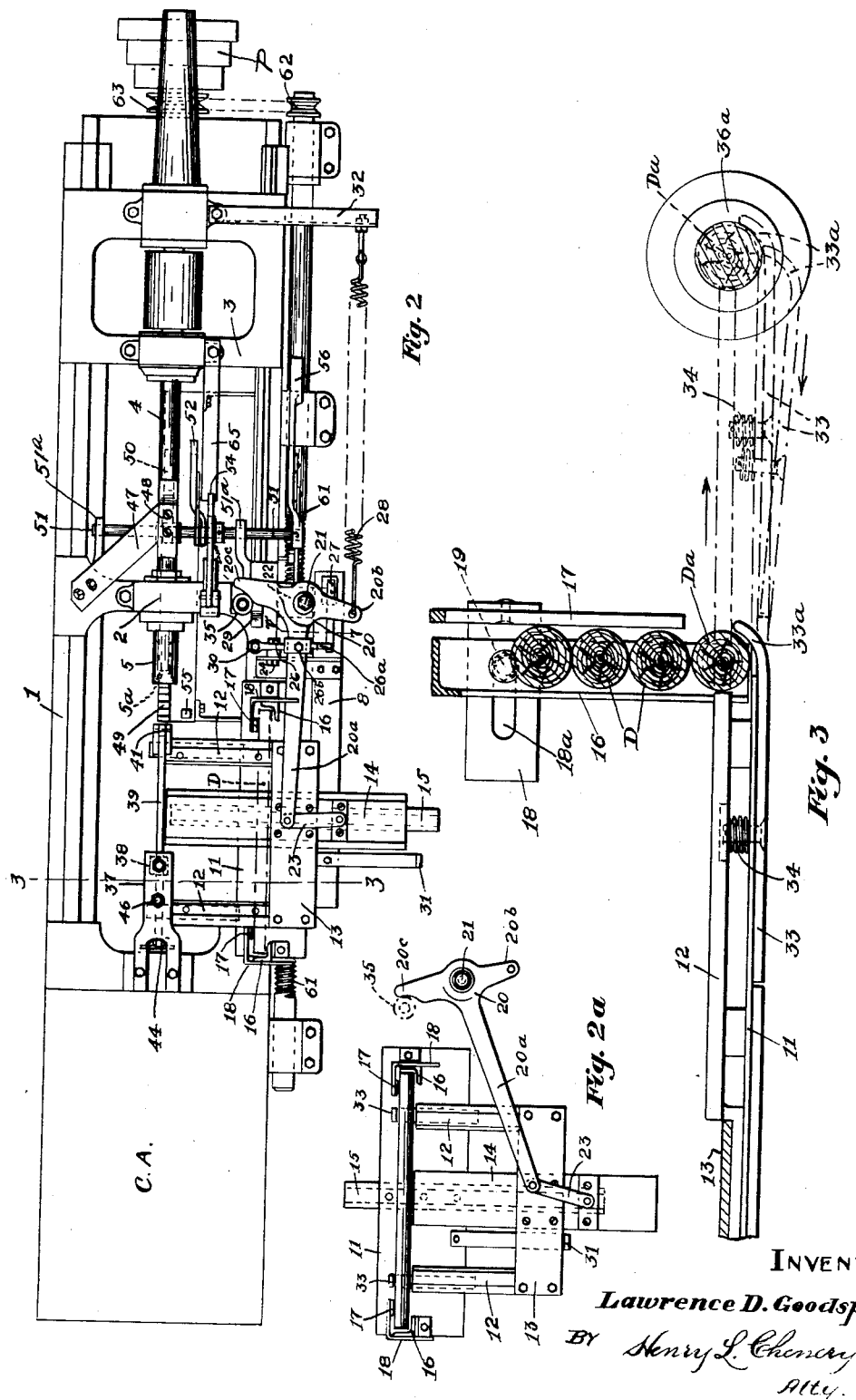
INVENTOR
Lawrence D. Goodspeed.
BY Henry L. Chenery
Atty.

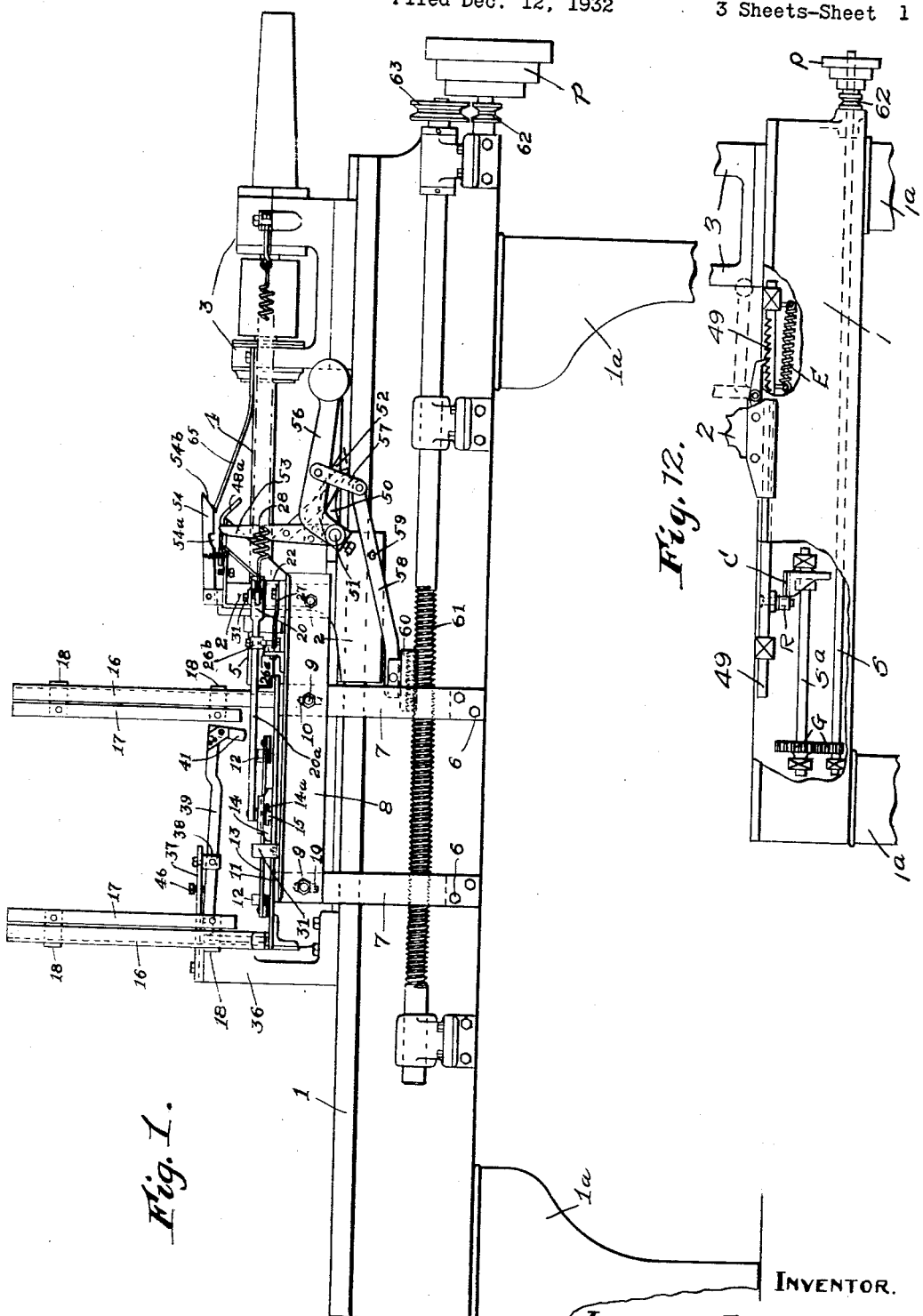

Sept. 26, 1933.  L. D. GOODSPEED  1,928,353
AUTOMATIC VARIETY WOOD TURNING LATHE
Filed Dec. 12, 1932    3 Sheets-Sheet 3
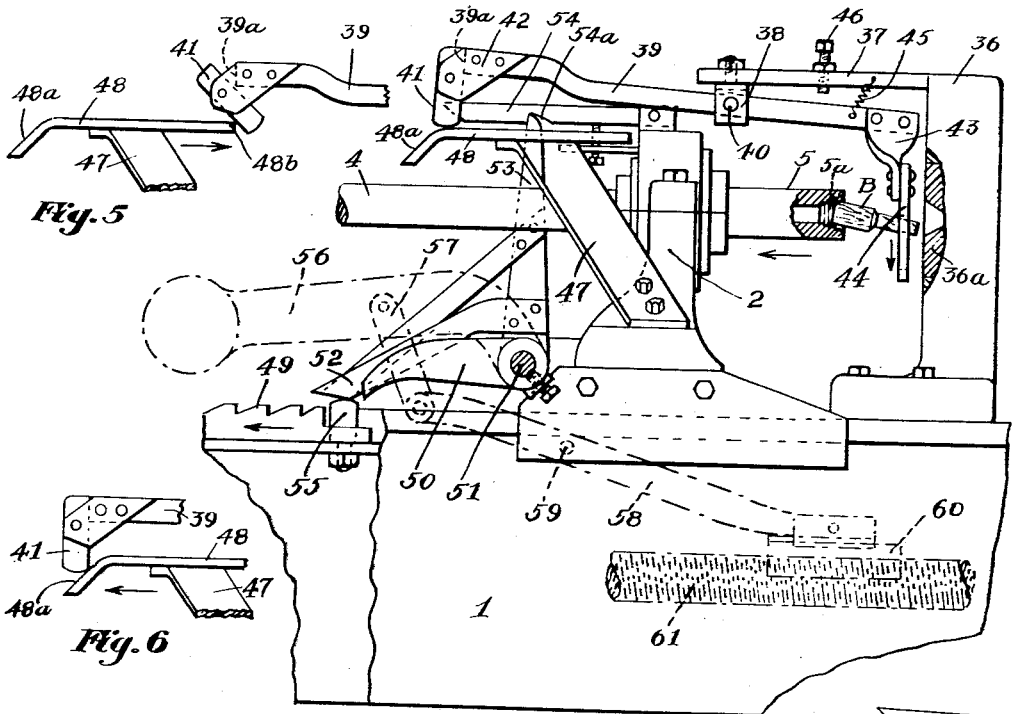
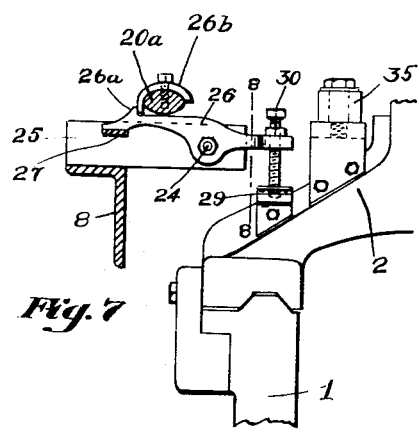
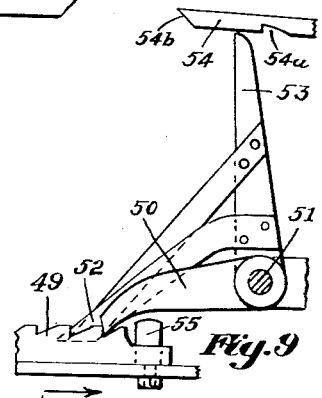
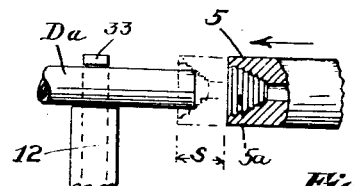
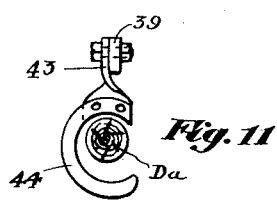
INVENTOR
Lawrence D. Goodspeed.
BY Henry L. Chenery
Atty.

Patented Sept. 26, 1933

1,928,353

UNITED STATES PATENT OFFICE 1,928,353

AUTOMATIC VARIETY WOOD-TURNING LATHE

Lawrence D. Goodspeed, Wilton, Maine

Application December 12, 1932
Serial No. 646,773

6 Claims. (Cl. 142—20)

This invention deals, in general terms, with automatic variety wood-turning lathes, so-called, and has as one of its principal objects an improved method of feeding to the chuck of the lathe the long lengths of lumber which are to be converted subsequently into short turned units,—such as handles, spools etc.

It further contemplates an automatically operating block-extracting mechanism which disposes of the small butt or waste end of the main stock piece left in the spindle chuck.

The invention still further provides automatic mechanism operating in conjunction with the usual, intermittently acting rack feed for the headstock and a feed screw, for returning the headstock to its starting position after the turning operations on each stick or piece of stock have been completed.

The conventional type of variety wood-turning lathe requires the operator to manually insert the stick of lumber in the chuck which rotates at an extremely high rate of speed. The butt end is removed, in operating the ordinary variety wood-turning lathe, by striking it a blow after the headstock has been pushed back to its rearward position by the operator.

In my improved equipment all the foregoing operations are performed automatically and the apparatus employed to carry out my invention are of such a character that they may easily be applied to the conventional type of semi-automatic lathe.

A clear understanding of the import of my invention may be gained by reference to the description found in the following specification when taken in connection with the accompanying drawings in which a preferred embodiment thereof is disclosed.

In the drawings,—

Fig. 1 is an elevation of a wood-turning lathe, viewed from the back side, with my equipment installed thereon, the cutting assembly being omitted;

Fig. 2 is a plan view of the same;

Fig. 2a is a portion of Fig. 2, showing a different position of the dowel feed mechanism;

Fig. 3 is a transverse sectional elevation of the dowel feed, section being on line 3—3, Fig. 2;

Fig. 4 illustrates, fragmentarily, the portion of the lathe carrying the longitudinal feed mechanism and the knock-off elements to remove a butt end;

Fig. 5 and Fig. 6 are details showing different positions of the trip link which actuates the knock-off mechanism;

Fig. 7 is a view, partly in section, taken on line 7—7, Fig. 2;

Fig. 8 is a section taken on line 8—8, Fig. 7;

Fig. 9 shows the rack feed throw-out mechanism;

Fig. 10 shows the relative positions of the chuck and dowel when the latter is moved into operative position to be engaged by the chuck;

Fig. 11 is an end view of the knock-off yoke, and

Fig. 12 illustrates the method of actuating the rack by a cam.

Similar reference characters identify like parts in all views.

Before beginning a description of my invention I will state that I have shown only so much of the details of a semi-automatic lathe as will suffice to comprehensively connect the working of the lathe with the equipment which is embodied in my invention.

Referring to the drawings, 1 represents the bed of the lathe, supported on legs 1a. The cutting assembly, or the tools and fixtures employed for the actual turning operations are not shown as they are conventional structures; they will be located, however, on the lathe at the position marked C. A.

The movable headstock is shown at 2, the fixed headstock at 3 and the lathe spindle at 4. On the inner end of the spindle is a chuck 5 made preferably without a flanged head. The bore, 5a, of the chuck is tapering at its outer end and serrated; this conforms to usual practice in constructing these lathe fixtures.

Fixed to the bed 1, by bolts 6, are upright members 7, on the upper ends of which is an angle iron element 8 secured to the uprights by bolts 9. Slots 10 in the uprights provide vertical adjustability for the angle iron 8.

Above the member 8 is a plate 11 and slidably mounted thereon is a frame structure comprising the transversely disposed dowel push-feed elements 12 interconnected by a longitudinally positioned member 13 which is secured to a central transverse slide 14. In this slide is a T slot 14a in which operates the slide rail 15, the latter being fixed on the member 11.

A stack of dowels, D, (see Fig. 3) from which the small novelty units are turned and severed, are disposed in a vertical tier within the magazine structure composed of angle irons 16 and flat bars 17, the former (16) being properly secured at their lower ends to the plate 11 and the latter (17) attached to the angle members 16 by angular plates 18 each of which has a slot 18a in which operates a bolt 19. This slotted construction provides for adjustment between the elements 16 and 17 to accommodate the magazine to different diameters of dowels.

The feed movement of the dowels from the magazine to the chucking position in the lathe is accomplished by a bell crank lever 20 swingingly mounted over the stud 21 which is fixed in the block 22 secured on the angle member 8.

The long arm of the lever, 20a, is connected to a link 23 which in turn makes connection to the transverse slide 14.

An enlarged fragmentary view of the dowel feed mechanism is shown in Fig. 3. While the push elements 12 are in their retracted positions (shown in full lines) a dowel drops to the plate 11. Upon the advance of the members 12 (shown in dot and dash lines) this particular dowel Da is moved into axial alignment with the chuck 5. At this time the feed frame temporarily locks against return movement in order to allow the chuck to move forwardly and engage the end of the dowel. The space indicated by S, in Fig. 10 represents the period of time during which the feed frame is locked in its innermost position, and in Figs. 2 and 7 the mechanism to accomplish this object is illustrated.

Pivotally mounted at 24 on the angle bar 25 is a latch lever 26, the latch end 26a rising, normally, in response to the uplifting action of the flat spring 27, fixed on the top of the angle 8. When the feed frame advances and is in its extreme inward position, as shown in Fig. 2, the latch 26a engages the steel band 26b secured on the arm 20a of the bell crank lever 20 and holds the lever—and the feed frame parts against the action of the long helical spring 28 which normally tends to return these parts to their outward positions.

The movable headstock 2 is shown, in Fig. 2, in its extreme rearward position but as it advances toward the cutting assembly end of the lathe an angular cam plate 29 secured on the headstock contacts with the end of the screw 30, raising that end of the lever 26 and releasing the latch 26a. The spring 28 now returns the feed frame to its outer position against the stop member 31, as shown in Fig. 2a. One end of the spring 28 is secured to the short arm 20b of the bell crank lever, and the other end to the bar 32 extending from the fixed headstock 3.

An underslung shoe 33, having an upturned outer end 33a, prevents displacement of the dowel from off the end of the feed frame. Immediately after the chuck has engaged the dowel the frame starts to return and the member 33 acting against the tension of the spring 34 yields as it passes rearwardly under the dowel, as shown in dot and dash lines, Fig. 3.

Positive actuation of the bell crank lever 20 to provide inwardly directed movement of the dowel feed frame is effected by a roll 35 revolubly mounted on the headstock 2 and which, upon the return movement of the headstock, impinges on the short arm 20c of the bell crank lever, moving the latter from position shown in Fig. 2a to that shown in Fig. 2.

The mechanism employed to extract the butt or waste end B of the dowel from the chuck after completion of the turning operations is illustrated in Figs. 1, 2 and 4.

Extending from the top of the die housing 36 is an arm 37 on the end of which is a block 38. A lever 39 pivotally mounted in block 38, at 40, has on its outer end a link 41 pivotally disposed between two side plates 42. The pivot point of the link is not at its center, longitudinally, this construction permitting it, normally, to hang in a substantially vertical position.

On the opposite end of lever 39 is a plate 43 to which is secured a yoke member 44 the open side of which is toward the dowels as they are fed to the chuck.

The normal position of lever 39 is shown in Fig. 1, a spring 45 drawing the lever against the adjusting stop screw 46. A bracket 47 fixed to the headstock 2 carries on its upper end a bar 48 with one end, 48a, bent downwardly.

As the headstock 2 approaches the die housing the link 41 makes contact with the portion 48b of the bar 48, rides its upper surface and passes over the end 48a of the bar, these movements being illustrated in Figs. 5 and 6.

On the recession movement of the headstock the link 41, now vertically disposed, contacts with the inclined surface 48a, and being held vertically by its engagement with the end 39a of the lever 39, it rises to the top surface of bar 48. This has the effect of lowering the opposite end of the lever 39 and the impingement of the yoke member 44 on the end of the butt B— which has meantime been drawn out of the die 36a by the chuck—results in freeing the chuck of the waste end of the dowel.

The forward feed of the headstock is accomplished in the old, or conventional manner of doing this work. A revoluble cam C (see Fig. 12) fixed on the shaft Sa reciprocates a rack 49 in one direction by impingement on a roll R secured on the rack. A spring E returns the rack after each reciprocation thereof made by the cam.

A set of gears G connects the shafts Sa and S and on the outer end of the latter is a stepped pulley P.

The cam-actuated rack imparts a succession of advancing movements to the headstock 2 through the agency of the pawl 50 which is fixedly mounted on a revoluble shaft 51 journalled in bearings 51a on the headstock.

Also fixed on the shaft 51 is a member 52 which, in my improved equipment, I employ as a trip lever which is secured on the vertically disposed latch lever 53. A latch arm 54 is pivotally secured at one end to the top of the headstock 2 and has a notch 54a on its under side.

In Fig. 9 the pawl 50 is shown in engagement with the last tooth in the rack 49. The chuck at this time is in close relation to the die housing 36 and extends through the opening in the yoke 44.

On the return intermittent movement of the rack (see Fig. 4) the button 55 engages the lower end of the trip lever 52, swinging the latch lever 53 into the notch 54a and locking the pawl out of contacting reach of the rack 49.

Secured on the shaft 51 is a weighted lever 56, extending from which is a link 57 making connection at its other end with a lever 58 pivoted on the headstock at 59. On the outer end of lever 58 is a half nut 60 which, when the parts are arranged as shown in Fig. 4, is in threaded engagement with the feed screw 61, the latter being continuously rotated by means of the stepped pulley P and the belt-connected pulleys 62 and 63.

The headstock is at this time being returned to the dowel chucking position and when arriving at the point at which it is shown in Fig. 1 the inclined face 54b of the latch arm 54 impinges on the latch bar 65 fixed on the stationary headstock 3, raising the latch arm 54 and releasing the latch lever 53. The weighted lever 56, through the agency of the link 57 and lever 58 now acts to disengage the half-nut 60 from the feed screw 61 and permits the pawl 50 to again engage the rack 49.

At this point the roll 35 will have made contact with the short arm 20c of the bell crank lever, swinging the feed frame and passing another length of the stock material to the chuck. These sequences of operation may be continued indefinitely and so long as the magazine is kept filled with unturned stock—either round, square or other shapes—the production of the finished articles will proceed.

The equipment, the structural and operating features of which have hereinbefore been set forth eliminates much of the hazard accompanying hand methods of inserting the lumber in the chuck. With my arrangement it is practically impossible for a stick to be thrown broadcast during the chucking operation, due to the fact that the yoke, as well as the chuck itself, confines the stick to a circumscribed space in which it may revolve before being trued by the preliminary cutters and passes into the die or ring member 36a.

The continuity of operation, the efficiency of the parts and the slight attention required on the part of the operator enables him to operate several of these lathes, thus further reducing the cost of production of turned novelties of various kinds.

What I claim is:

1. An automatic wood-turning lathe comprising in combination a bed, a headstock, having a spindle rotatively disposed therein, adapted to longitudinally traverse said bed, a dowel chuck on said spindle, a bell crank lever swingingly mounted on a fixed portion of said lathe, a dowel magazine, a dowel-feed frame operatively connected to one arm of said bell crank lever and adapted to operate transversely of said bed, a roll on said headstock adapted, on the receding movement of said headstock, to engage another arm of said bell crank lever and cause said dowel-feed frame to advance the lowermost dowel in said magazine into mutually axial alignment with said chuck, and a latch operable to lock said dowel-feed frame against return movement when it has arrived at its extreme inward position.

2. In an automatic variety wood-turning lathe the combination with a bed, a headstock having a spindle operable therein and means to advance said headstock on said bed by a series of intermittent movements, of a flangeless dowel chuck mounted on the end of said spindle, a dowel magazine, a bell crank lever rotatively mounted on a fixed portion of said lathe, a dowel-feed frame operatively connected to one arm of said bell crank lever, a roll mounted on said headstock and adapted to impinge on another arm of said bell crank lever when said headstock is nearing the end of its return movement on said bed, and cause said dowel-feed frame to move inwardly and advance a dowel from said magazine into operative position in said lathe, a latch adapted to temporarily hold said dowel-feed frame against return movement when in its extreme inward position, and a cam plate on said headstock adapted to unlatch said dowel-feed frame when said chuck has advanced to a position to engage the dowel.

3. An automatic wood-turning lathe comprising in combination a bed, a headstock disposed on said bed, a rack, a shaft journalled in said headstock, a pawl fixed on said shaft and engageable with said rack, means to actuate said rack by a plurality of short advance and retreat movements causing said headstock, through the agency of said pawl, to be progressively and intermittently moved forwardly on said bed, a trip lever fixed on said shaft, a trip button operating in conjunction with said rack adapted on the last retreat movement of said rack to cause said pawl to become disengaged therefrom, means to return said headstock to its rearward position on said bed, and a latch lever to hold said pawl disengaged while said headstock is being automatically returned to its starting position.

4. An automatic wood-turning lathe comprising in combination a bed, a headstock, a transversely disposed shaft journalled in said headstock, a pawl fixed on said shaft, a reciprocable rack adapted to engage said pawl for the purpose of advancing said headstock, said advance being accomplished by a series of advance and retreat movements of said rack, tripping means to disengage said pawl from said rack on the last retreat movement of said rack, a weighted lever, the lighter end of which is fixed on said shaft, a feed-nut lever pivotally mounted on said headstock, a link connecting the two last mentioned levers, a feed screw, a half-nut on the free end of said feed-nut lever adapted to engage said feed screw simultaneously with the release of said pawl from said rack, and locking means to hold said pawl released from said rack, and said half-nut in engagement with said feed screw until said headstock has been returned, by said feed screw, to the position from which it started to advance on said bed.

5. An automatic wood-turning lathe having characteristics according to claim 4, and means, when said headstock has reached its rearward position, to release said locking means whereby said pawl and rack may become re-engaged and said half-nut and feed screw disengaged, respectively.

6. An automatic wood-turning lathe comprising in combination with a bed, a movable headstock and a fixed die housing member disposed on said bed, a stock chuck, adapted to hold dowels or unturned material, operable on said headstock, a dowel magazine, a dowel-feed frame, means to actuate said dowel-feed frame, transversely of said bed, whereby the dowels from said magazine may be moved, singly, into longitudinal alignment with said chuck, an arm fixed on and extending from said die housing in a direction toward said headstock, a lever pivotally hung on said arm, an open side yoke member fixed on the end of said lever adjacent said die housing adapted, normally to loosely surround the dowel when within said housing, a link pivotally connected to the opposite end of said lever, and a bar on said headstock extending rearwardly therefrom and having a downwardly bent portion on the free end thereof, said link, on the advancing movement of said headstock, yielding as it contacts with and passes over said bar, but upon the return movement of said headstock said link is adapted to shoulder on the end of said lever and ride the inclined end and upper surface of said bar, whereby the link end of said lever is raised and the yoke end depressed thereby bringing said yoke into strong contact with the waste end of the dowel effecting its removal from said chuck.

LAWRENCE D. GOODSPEED.